Figure 1:
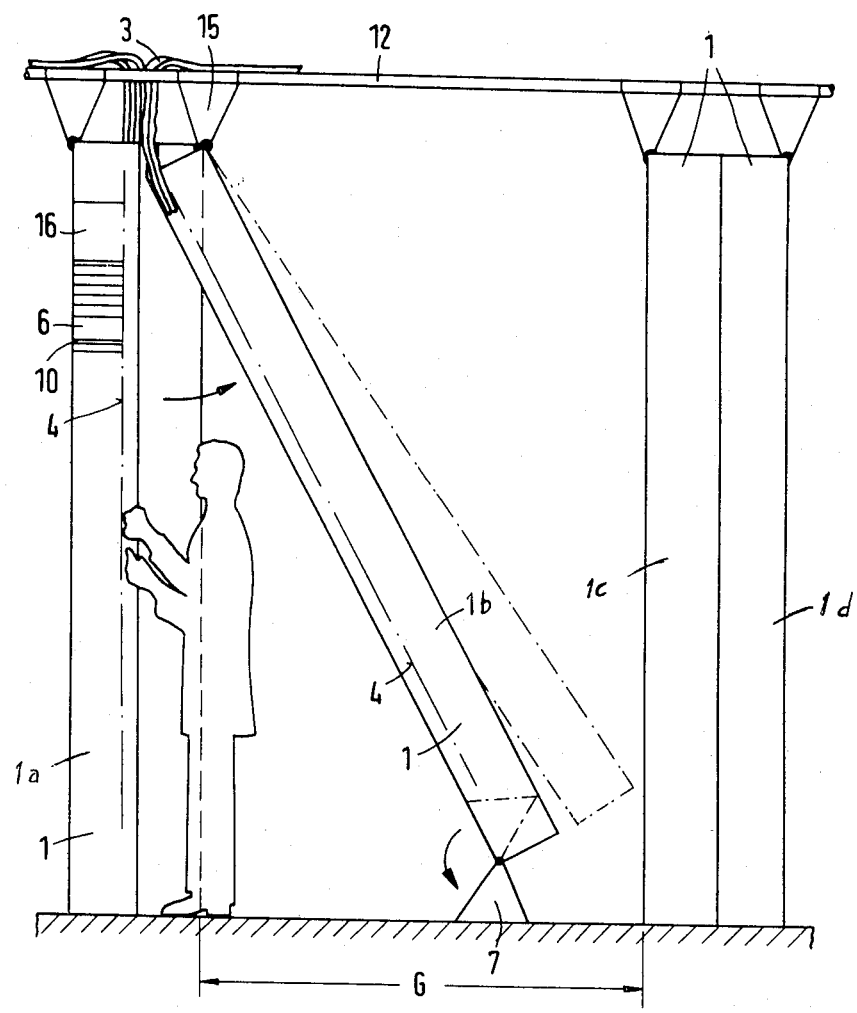

United States Patent [19]

Hermanutz et al.

[11] 4,352,146
[45] Sep. 28, 1982

[54] RACK STRUCTURE FOR ELECTRICAL COMMUNICATIONS EQUIPMENT

[75] Inventors: Peter Hermanutz, Ditzingen; Franz Roessler, Hemmingen, both of Fed. Rep. of Germany

[73] Assignee: International Standard Electric Corporation, New York, N.Y.

[21] Appl. No.: 281,819

[22] Filed: Jul. 9, 1981

Related U.S. Application Data

[63] Continuation of Ser. No. 99,147, Nov. 30, 1979, abandoned.

[30] Foreign Application Priority Data

Dec. 7, 1978 [DE] Fed. Rep. of Germany ....... 2852823

[51] Int. Cl.³ .......................... H02B 1/20; H05K 7/16
[52] U.S. Cl. .................................... 361/428; 361/415; 211/169; 312/223
[58] Field of Search ............. 179/98; 312/223, 235 R, 312/255, 322; 248/291; 211/41, 169; 361/331, 332, 334, 340, 390–395, 399, 412, 428, 429, 413, 415; 339/4, 17 LM

[56] References Cited

U.S. PATENT DOCUMENTS

| | | | |
|---|---|---|---|
| 2,881,040 | 4/1959 | Hartridge | 312/235 R |
| 3,030,166 | 4/1962 | Richards | 312/235 R |
| 3,316,461 | 4/1967 | Henke | 361/390 |
| 4,131,934 | 12/1978 | Becker | 361/395 |
| 4,135,225 | 1/1979 | Welsh | 361/394 |

FOREIGN PATENT DOCUMENTS

1904596 5/1977 Fed. Rep. of Germany.
2628489 7/1978 Fed. Rep. of Germany.

*Primary Examiner*—Gerald P. Tolin
*Attorney, Agent, or Firm*—James B. Raden; Marvin M. Chaban

[57] ABSTRACT

Mounting structure for a bay of racks of electrical equipment, such as telephone switching apparatus which extends vertically between a support floor to almost the height of a cable runway extending horizontally between racks of the bay. Each rack includes at least one subrack comprised of sidewalls with horizontal separators joining the sidewalls. The separators mount switching modules in a slide-in relationship. One sidewall of a subrack is hinged to the cable runway to enable the subrack to be tilted away from the normal vertical position allowing access to a paired subrack and to cables connected to the tilted subrack.

4 Claims, 2 Drawing Figures

RACK STRUCTURE FOR ELECTRICAL COMMUNICATIONS EQUIPMENT

This is a continuation of application Ser. No. 99,147, filed Nov. 30, 1979, now abandoned.

In the fields of electrical communications engineering, the so-called vertical style construction layout has found wide acceptance. This term refers to the stacked arrangement of the equipment units (channel translating subrack, amplifiers, transmitters, receivers, etc.) within relatively narrow racks generally termed rack structure herein. Any arbitrary number of racks placed next to each other form rack bays. Above the rack bays, there extends a cable runway (cable shelf) on which both the incoming and outgoing cables are placed. In order to utilize the floor space in the operating station rooms, two rack bays are generally positioned back-to-back.

The equipment units or rack structure are formed by relatively long subracks which are provided on one face side called the front face with a suspension device, while being set off at the other end on the rear side and provided in this setoff portion with connectors. Inside their housings, the subracks are equipped with horizontally guided slide-in modules which are inserted from the front face and which mostly represent self-contained function units. The electrical connections of the slide-in modules are established via rearward blade contact strips which, upon insertion, come into contact with corresponding spring contact strips of the subrack. The internal subrack wiring is connected to the already mentioned connectors arranged in the setoff portion of the subrack housing.

Each time two such subracks (equipment units) are stacked within the rack, with the upper subrack being suspended from the top edge and then swivelled into position with its lower end, while the lower subrack turned by 180° is suspended from below and swivelled into position with its other end. In this way, all connections are arranged together in a central panel, with the cables leading down from the cable runway, likewise ending there at spring contact strips attached to the central panel. In this way, a rack wiring is rendered superfluous, and the subracks are connected directly to the exchange (office) cables.

By the German Federal Post Office (DBP), this mechanical system design has been standardized under the name "Bauweise 7" and has been described in greater detail, for example, in "Siemens-Zeitschrift", April 1965, No. 4 on page 310 et seq.

A further development of this mechanical system design is the so-called "Bauweise 7R" which has, meanwhile likewise, been standardized by the DBP. For reasons of compatibility, the rack dimensions of the mechanical system design 7 (Bauweise 7) have been maintained, but there has been a departure from the principle of assembling equipments in racks. In this type of mechanical system design, console-type mounting elements for the vertical subracks may be attached at any suitable-points to the rack supports.

The height of the subracks can be chosen in accordance with the actual requirements, and may be subdivided optionally into component space and connector panel. From this there results a greater flexibility with a view to the setup and combination of the equipment subracks to form systems and installations. On the other hand, there are omitted the cable terminals in the central panel which is no longer provided for, so that now an individual cabling of the rack shelves is necessary, as was already the case on principle with the earlier horizontal types of mechanical system designs.

In the 7R-type mechanical system design, the cable terminals are each arranged in the console type mounting elements which, in addition thereto, still contain guide rails serving the mechanical holding of the slide-in type subracks. The latter in their construction layout substanially resemble those of the 7-type mechanical system design. At one end on the rear side, the subrack housing is set off to such an extent that the connectors (blade contact strips, coaxial connectors) have sufficient space; the interior of the subrack housing is equipped with slide-in modules inserted from the front side with the rearward connector members thereof being in electrical contact with the subrack wiring. All essential features of this particular mechanical system design are described, for example, in the German Pat. No. 19 04 596.

Yet, both of these mechanical system designs, in spite of all their advantages, still have certain deficiencies. The reasons for this are described hereinafter. Within a rack depth of 450 mm, which is in accordance with CCITT standards, two racks or rack bays, each having a depth of 225 mm, are placed back-to-back or one rack or rack bay is placed with its back to the wall. In both cases, the rearward rack cabling is no longer accessible once the racks have been equipped with the system units (subracks). Therefore, the subracks have been designed pluggable in order to permit access to the rack cabling in the case of measurements, repairs, expansions, etc. This, however, requires two planes of insertion, namely the connectors firstly between the rack and the subracks and secondly between the subrack and the slide-in modules.

One disadvantage is seen in the enormous amount of connectors which, of source, is also linked with a considerable assembling and connecting work. The other, actually more serious disadvantage resides in that the rack cabling and the terminals thereof are only accessible after the subracks have been removed, this causing the outage of entire channel translating subracks, transmitters, etc. for the time required for the fault finding or repair.

Of course, it has already been attempted to reduce the number of connectors by replacing them by contact strips provided with wire-wrap posts mounted to the flat bars of the racks, and by replacing the subrack wiring by printed circuit boards. To the wire-wrap posts, there are connected, on one hand, the rack cables and, on the other hand, these posts project to such an extent that they, upon insertion of the subrack, still extend by such an amount through the wiring board thereof that the spring contact strips of the slide-in modules can be plugged in, as shown by German Auslegeschrift No. (DE-AS) 26 28 489.

According to this solution, the two planes of insertion are placed so near to each other that one of four connector components can be omitted. This, however, gives rise to new problems. For example, very high demands are placed on the manufacturing accuracy because the great number of relatively thin contact pins must be in alignment not only with the receiving bores of the subrack wiring board, but also with the spring contact strips of the slide-in modules. On the other hand, it will have to be expected that pins will bend or snap (break off) already after a few plug-in operations, thus jeopardizing the proper functioning of entire subracks. The contact-making between the pin and the receiving positioning hole represents a further difficult problem. On the whole, however, such a solution can only be realized by involving a considerable investment in cost apart from the fact that the mechanism for holding the subracks in position is still rather expensive now as before.

It is the object of the invention, therefore, to eliminate the disadvantages of the conventional arrangements, and to provide a construction which is much more simple to manufacture and to handle and in which yet the number of connectors is substantially reduced.

By assembling all slide-in modules in one continuous subrack which is tiltably suspended from the cable runway (cable shelf), it becomes possible to tilt up the subrack at its bottom end up to the full width of the gangway between the racks, and to step behind it so that the rear sides of two subracks become completely accessible. The special advantage is to be seen in that measuring or servicing works can be carried out without any interruption of the operation because the cables are led to the connectors and no slide-in modules have to be unplugged.

Moreover, by leading the cables in this way, there only remains one connector plane or, in other words, one connector only is inserted in each line leading to an equipment. Compared with earlier mechanical system designs, the number of connectors is, in this way, reduced to almost one half. This not only involves an enormous saving of costs, but noticeably increases the reliability of the system. The simple, robust design of the subrack, which is relatively insensitive to damages, also adds to this operational reliability. The partition walls inserted for the purpose of reinforcing the sidewalls make it possible, in addition thereto, to replace the usual horizontal slide-in modules at least partly by vertical ones which are then no longer bound to the size determined by the width of the subrack, but may be larger.

Moreover, it is of importance that the rack frames can be omitted entirely. In this way, there are not only omitted the frames as such and the work involved in the manufacture and assembly thereof, but also the mechanical connecting devices as well as the electrical connectors for the subracks may be done away with. Further advantages will become evident from the following description.

Figure 2:
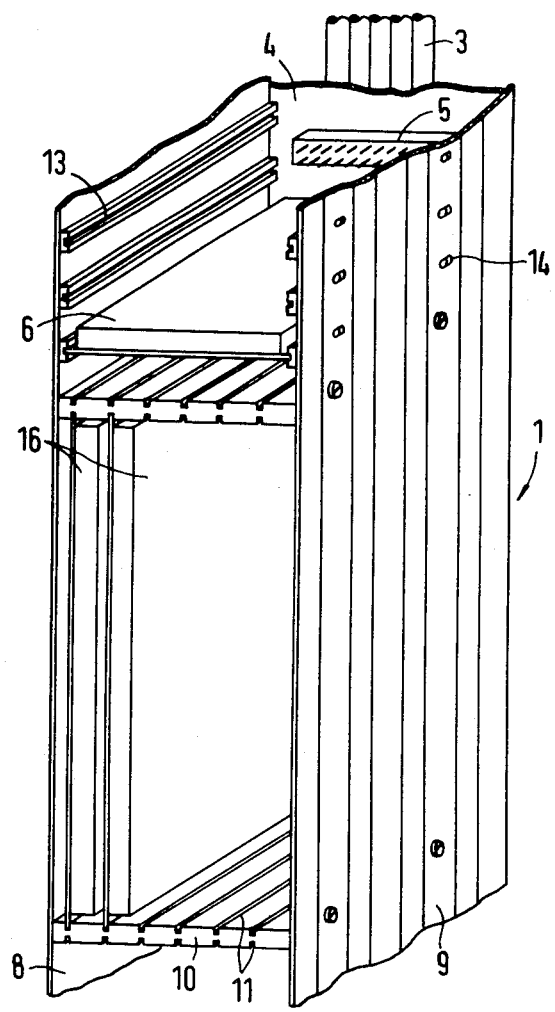

The invention will now be described in greater detail with reference to an example of embodiment shown in FIGS. 1 and 2 of the accompanying drawings, in which:

FIG. 1 is a cross-sectional view taken through the rack bays positioned in one room containing transmission-technical equipment in a schematical representation; and FIG. 2 shows part of a subrack with which the racks, according to FIG. 1, are equipped in a perspective representation.

FIG. 1 is the cross-sectional view of rack structure according to out invention comprised of four aligned racks within which there are shown subracks $1a$, $1b$, $1c$ and $1d$ which are identical in general construction. The racks are paired $1a$ with $1b$ and $1c$ with $1d$ and within a pairing, the racks are placed back-to-back. Owing to standardization, the dimensions relating to height, depth or width of the rack are predetermined as well as the spacing between the rack bays or the size of the remaining gangway G indicated by the dimension arrows. Above the racks, there extends the cable runaway (cable shelf) 12 on which all cables 3, including the incoming, the outgoing and the rack-connecting lines, are placed.

Each rack alignment is equipped with one subrack 1 extending throughout the entire height from the floor to the cable runway. This subrack 1 is comprised of a right hand and a left hand side wall 8 and 9 which are formed e.g. by sectional bars (FIG. 2). They are connected with one another with the aid of partition walls 10 provided with guide grooves 11 capable of taking up vertically standing slide-in modules 16. For the purpose of accommodating horizontal slide-in modules 6, the side walls are provided with boreholes 14 into which the guide rails 13 may be hooked.

To the rear or cabling side of the subrack 1, there is mounted a wiring board 4 containing the internal subrack wiring. On this board, there are also mounted the connectors 5 into which the slide-in modules are plugged on one hand, and to which the external rack cabling 3 is connected on the other hand. Appropriately, the subrack wiring board 4 is subdivided several times throughout the entire height of the rack in order, thus, to obtain dimensions suitable for the manufacture. In cases where the wiring board 4 is only supposed to serve the mechanical accommodation of the connectors 5, wiring is carried out via wire-wrap posts. As a rule, the wiring board will be a printed circuit board comprised e.g. of a double-sided printed circuit board, a multi-layer board or two double-sided printed circuit boards connected to one another by using continuous pressed-in square contact pins simultaneously serving as wire-wrap posts.

The subrack 1, which is designed in this way, is suspended at its upper front edge (in the case of subrack $1b$, at the upper edge of side wall 9) or board insertion side in such a way from a hinge 15 attached to the cable runway (cable shelf) 12 that the subrack, by clearing the width of the gangway G within the exchange installation either completely or partly, can be tilted in the forward direction (F(G. 1). The subracks, such as $1a$ and $1b$, are paired and each is hinged along the edge of the side (called the front side herein) away from the subrack with which it is paired, as can be seen in FIG. 1. The cables from the cable runway are grouped adjacent the unhinged side of the subrack (as shown in FIG. 1) to allow access to the cables when one or both subracks are in the tilted condition. The axis about which a subrack is tilted is parallel to the direction of insertion or removal of boards into the subrack so that tilting of a subrack has no sidewise effect on the boards mounted in the subrack. In the course of this, a hinged support 7 drops out automatically, e.g. owing to its own weight, permitting a reliable arresting of the subrack 1 in its tiled position. By this tilting of the subrack 1, the rearward wiring 4 becomes accessible, and also the wiring of the adjacent subrack of the same alignment standing therebehind, as can be seen from FIG. 1.

In practice, when working at one subrack, the one standing therebehind will most suitably be tilted away so that the one that is being worked at will remain in the vertical position. It might be appropriate to tilt the neighboring subracks away as well in order, thus, to have a wider working space. If necessary, also subracks standing behind each other may be tilted. In this way, the working area becomes still larger.

In cases where initial installation is carried out in the tilted state, there is automatically provided a small, but necessary cable reserve. When the subrack is tilted back into the normal position, this excessive length of the cable 3 is stowed away into the cable runway 12.

What is claimed is:

1. A rack structure for supporting a plurality of wiring boards each capable of receiving one or more modular plug-in circuit boards, said structure including a subrack which in its normal position extends substantially vertically from its upper end to a lower end adjacent a support floor, a cable runway extending substantially horizontally above the upper end of said subrack, means hinging said subrack for unitary tilt movement about the axis of the hinging means from said normal position to one of a plurality of tilt positions with said subrack at respective acute angles from the normal position in the tilt positions, said subrack including a pair of spaced sidewalls with a cabling wall along one face of the spaced sidewalls for supporting wiring boards, the opposed face of the subrack being open for the insertion of said circuit boards for mating contact with respective wiring boards, a support member hinged to the subrack adjacent the lower end thereof, said support member hingedly movable to a support position resting on the support floor to maintain said subtrack in a tilt position enabling access to the cabling wall of the subrack.

2. A rack structure as claimed in claim 1, in which said support member is hinged to automatically move to said support position when the angle of tilt of said subrack exceeds a predetermined tilt angle.

3. A rack structure for supporting a plurality of plug-in modular circuit boards comprising a first and a second upright subrack paired together in close proximity, a generally horizontal cable runway positioned adjacent the top of the rack structure for bearing cables for connection to both said subracks, each subrack of said structure extending from adjacent said cable runway at its top to its bottom adjacent a support floor, each subrack including essentially vertical sidewalls with lateral separators spacing said sidewalls, each subrack including cable connectors at one side thereof with the opposite side being open for entry by said modular circuit boards, the subracks of the pair having their cable connector sides juxtaposed to one another to receive cable from said runway at the connector side of each subrack, each subrack having an entry side at the side away from the paired subrack, individual means hinging the sidewalls of each subrack to the cable runway adjacent the entry side of each subrack whereby either subrack may be individually tilted upwards away from the paired subrack enabling access to the cables and cable connections of each subrack for maintenance and service.

4. A rack structure as claimed in claim 3, in which said lateral separators include means for receiving said modular circuit boards for plug-in entry to said cable connections.

* * * * *